(12) United States Patent
Hu et al.

(10) Patent No.: US 9,135,749 B2
(45) Date of Patent: Sep. 15, 2015

(54) METHOD AND APPARATUS FOR PROCESSING THREE-DIMENSIONAL MODEL DATA

(71) Applicant: International Business Machines Corporation, Armonk, NY (US)

(72) Inventors: Guo Qiang Hu, Shanghai (CN); Fan Jing Meng, Beijing (CN); Jian Wang, Beijing (CN); Yi Min Wang, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 13/718,436

(22) Filed: Dec. 18, 2012

(65) Prior Publication Data

US 2013/0176304 A1 Jul. 11, 2013

(30) Foreign Application Priority Data

Dec. 30, 2011 (CN) .......................... 2011 1 0461368

(51) Int. Cl.
*G06T 17/20* (2006.01)
*G06T 19/00* (2011.01)

(52) U.S. Cl.
CPC ................. *G06T 17/20* (2013.01); *G06T 19/00* (2013.01); *G06T 2210/08* (2013.01)

(58) Field of Classification Search
CPC ......... G06T 9/001; G06T 17/20; G06T 17/00; G06T 2210/08; G06T 17/205; G06T 2219/2021; G06T 17/05; G06T 19/00; G06T 3/4092

USPC .......... 345/419, 420, 423, 428; 382/232, 233, 382/238, 243

See application file for complete search history.

(56) References Cited

U.S. PATENT DOCUMENTS 7,042,454 B1 5/2006 Seligman
7,789,959 B2 9/2010 Fichtner et al.
(Continued)

FOREIGN PATENT DOCUMENTS

CN 1738247 A 2/2006
CN 101119485 A 2/2008
CN 101364310 A 2/2009

OTHER PUBLICATIONS

Gu et al.; Packetization of 3D progressive meshes for streaming over lossy networks; Computer Communications and Networks, 2005. ICCCN 2005. Proceedings. 14th International Conference on; pp. 415-420; IEEE; 2005.*

(Continued)

*Primary Examiner* — Carlos Perromat
(74) *Attorney, Agent, or Firm* — Scully, Scott, Murphy & Presser, P.C.; Jennifer Davis, Esq.

(57) ABSTRACT

Apparatus and method for the network transmission and displaying of the computer graphics. The method and apparatus for processing three-dimensional model data includes: obtaining the mesh data for an original mesh model; constructing a derivative mesh model from the vertex data for the original mesh model by using a pre-defined mesh model construction algorithm; comparing the mesh data for the original mesh model with the mesh data for the derivative mesh model to obtain the error data for the derivative mesh model; transmitting the vertex data related to the original mesh model; and transmitting the error data for the derivative mesh model.

20 Claims, 7 Drawing Sheets

(56) References Cited

U.S. PATENT DOCUMENTS

Figure 1:
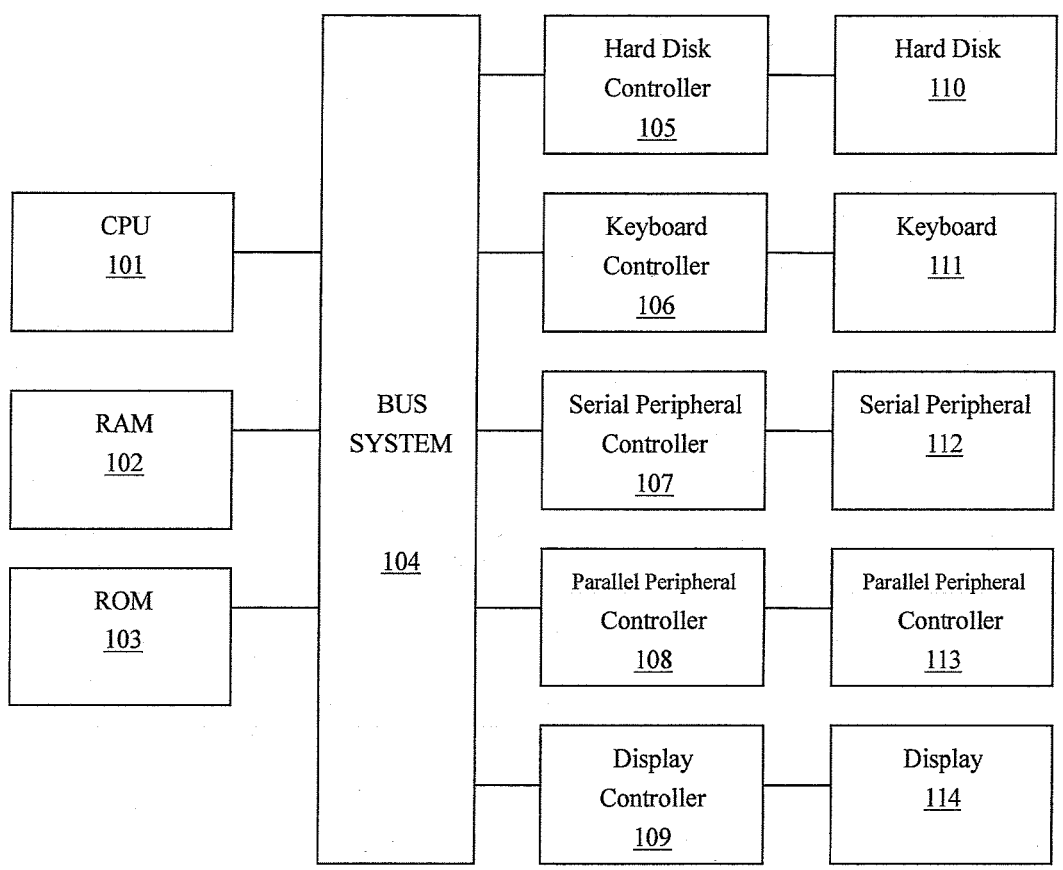

| | | | |
|---|---|---|---|
| 8,860,723 B2* | 10/2014 | Johansson et al. | 345/423 |
| 2004/0164987 A1 | 8/2004 | Aronson et al. | |
| 2006/0164415 A1* | 7/2006 | Smith et al. | 345/423 |
| 2008/0269397 A1 | 10/2008 | Fichtner et al. | |
| 2009/0184956 A1 | 7/2009 | Kim et al. | |

OTHER PUBLICATIONS

Zhang et al.; Octree-based animated geometry compression; Data Compression Conference, 2004. Proceedings. DCC 2004; pp. 508-517; IEEE; 2004.*

CN1954039A, English language Abstract, Apr. 25, 2007.

JP2005194387A, English language Abstract, Jul. 21, 2005.

International Search Report, PCT/CN2012/075432, dated Feb. 28, 2013.

International Search report mailed Feb. 28, 2013, PCT/CN2012/085179.

Kim et al., "View-dependent Transmission of Three-dimensional Mesh Models Using Hierarchical Partitioning", Visual Communications and Image Processing 2003, Proceedings of SPIE vol. 5150 (2003) pp. 1928-1937.

OuYang et al., "Reconstruction of 2D polygonal curves and 3D triangular surfaces via clustering of Delaunay circles/spheres", CAD Computer Aided Design, v 43, n 8, pp. 839-847, Aug. 2011, USSN: 00104485; DOI: 10.1016/j.cad.2011.04.003, Elsevier Ltd.

Kao et al., "Representing Progressive Dynamic 3D Meshes and Applications", 2010 Pacific Graphics (PG), Proceedings 18th Pacific Conference on Computer Graphics and Applications, pp. 5-13, 2010, ISBN-13: 978-1-4244-8288-7; DOI: 10.1109/PacificGraphics.2010.9, IEEE Computer Society, Los Alamitos, CA, USA.

* cited by examiner

210

220

230

| vertex | coordinates | | |
|---|---|---|---|
| v1 | x1 | y1 | z1 |
| v2 | x2 | y2 | z2 |
| v3 | x3 | y3 | z3 |
| ... | ... | ... | ... |

240

| face | vertex | | |
|---|---|---|---|
| f1 | v1 | v2 | v3 |
| f2 | v1 | v3 | v4 |
| ... | ... | ... | ... |

250

| edge | vertex | |
|---|---|---|
| e1 | v1 | v2 |
| e2 | v1 | v3 |
| ... | ... | ... |

260

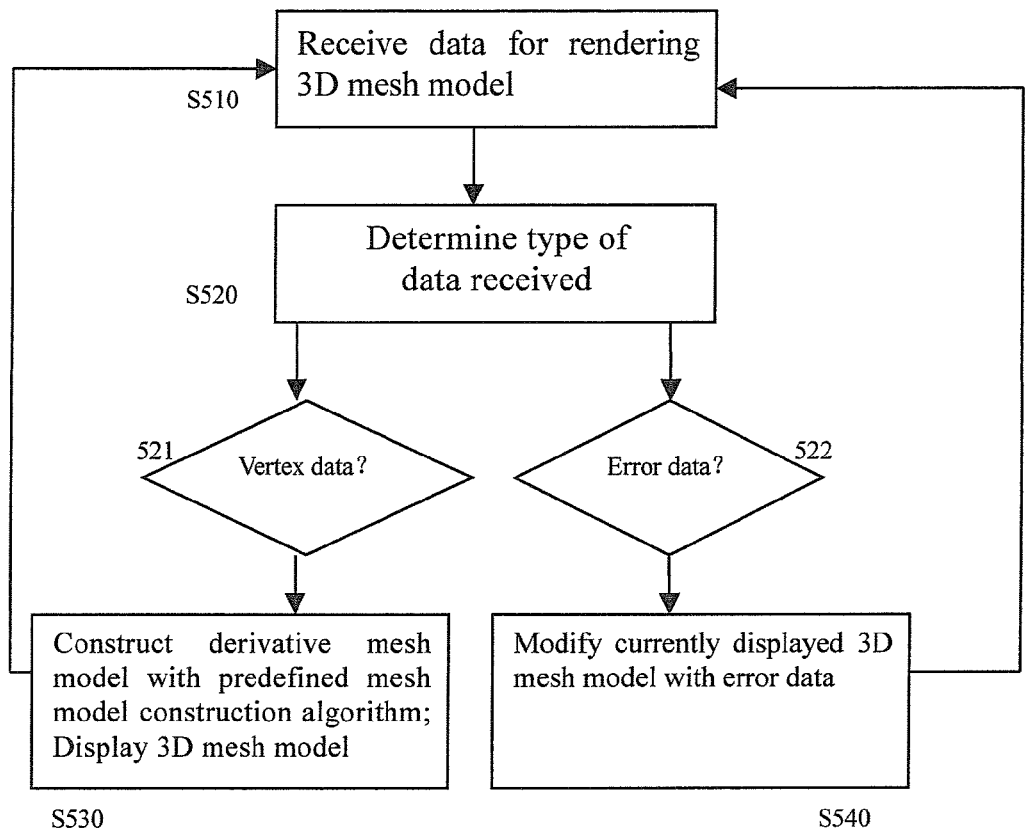
Fig.5
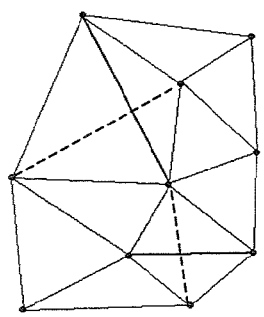    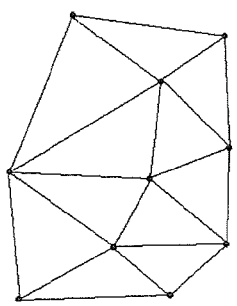    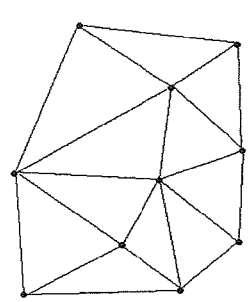
Fig.6A                Fig.6B                Fig.6C

METHOD AND APPARATUS FOR PROCESSING THREE-DIMENSIONAL MODEL DATA

FIELD OF THE INVENTION

The invention generally relates to network transmission and display of the computer graphics and, in particular, to processing of mesh data for the three-dimensional graphics.

BACKGROUND

The three-dimensional (3D) graphics is widely used in multimedia applications such as virtual world, video games, and so on. The three-dimensional graphics is usually represented with the three-dimensional model, and the mesh model is a commonly used three-dimensional model. In general, the mesh data for describing a mesh model is of enormous amount of data. In the Internet-based 3D graphics applications, it is often needed to transmit large amount of mesh data from a source computer (e.g., server) to a target computer (e.g., client) via the network. In the case of limited network bandwidth resources, if the amount of mesh data to be sent from the source computer to the target computer is large, it is likely that the mesh data can not be delivered in a timely manner, resulting in the corresponding 3D graphics being unable to be shown timely, which has adverse impacts on the user experience. Multimedia user may wish that, even in the case of limited bandwidth resources, the mesh data can be transmitted through computer networks at a satisfactory speed.

In the prior art there is a method for progressively transmitting the mesh model data. For example, in a paper "Progressive Mesh" (H. Hoppe, ACM SIGGRAPH 1996 Proceedings), there is a proposed method for transmitting the 3D mesh model. According to the method, 3D mesh models are converted into hierarchical meshes which are stored in the server. A hierarchical mesh comprises a number of sub-meshes. The sub-meshes each contain a part of information on the 3D mesh models and vary in the amount of information. Through the transmission of each sub-mesh, the data for the 3D mesh model is gradually transmitted to the receiving side. The receiving side, upon receiving the information of the sub-mesh, will display the corresponding three-dimensional graphics. Over time, the three-dimensional graphics displayed at the receiving side is getting closer and closer to the original 3D mesh model, until they become identical. The above-described method of the prior art, in the transmission of sub-meshes, is required to simultaneously transmit both the vertex data and the edge data for the original 3D mesh model.

SUMMARY OF THE INVENTION

One of the objectives of the invention is to improve the way of transmitting mesh data for mesh models via computer networks so as to increase the speed of displaying 3D graphics at the target computer receiving the data.

In one aspect, it is provided a method for processing three-dimensional model data, comprising: obtaining the mesh data for an original mesh model; constructing a derivative mesh model from the vertex data for the original mesh model by using a pre-defined mesh model construction algorithm; comparing the mesh data for the original mesh model with the mesh data for the derivative mesh model to obtain the error data for the derivative mesh model; transmitting the vertex data related to the original mesh model; and transmitting the error data for the derivative mesh model.

In another aspect, it is provided a method for processing three-dimensional model data, comprising: receiving data for rendering a three-dimensional mesh model; In response to the received data being the vertex data related to an original mesh model, performing the following: constructing a derivative mesh model from the vertex data for the original mesh model by using a pre-defined mesh model construction algorithm; and displaying a three-dimensional model based on the constructed derivative mesh model; and in response to the received data being the error data for the derivative mesh model, modifying the three-dimensional mesh model that is being displayed with the received error data.

In still another aspect, it is provided an apparatus for processing three-dimensional model data, comprising: a data acquiring unit, configured to obtain the mesh data for an original mesh model; a mesh model construction unit, configured to construct a derivative mesh model from the vertex data for the original mesh model by using a pre-defined mesh model construction algorithm; a comparison unit, configure to compare the mesh data for the original mesh model with the mesh data for the derivative mesh model to obtain the error data for the derivative mesh model; a vertex data transmission unit, configured to transmit the vertex data related to the original mesh model; and an error data transmission unit, configured to transmit the error data for the derivative mesh model.

In yet still another aspect, it is provided an apparatus for processing three-dimensional model data, comprising: a data receiving unit, configured to receive data for rendering a three-dimensional (3D) mesh model; a data type judging unit, configured to determine the type of the data received by the data receiving unit; a mesh model construction unit, configured to, in response to the received data being the vertex data related to an original mesh model, construct a derivative mesh model from the vertex data for the original mesh model by using a pre-defined mesh model construction algorithm; and a 3D model rendering unit, configured to display the constructed derivative mesh model, wherein the 3D model rendering unit is further configured to, in response to the received data being the error data for the derivative mesh model, modify the three-dimensional mesh model that is being displayed with the received error data.

BRIEF INTRODUCTION TO THE DRAWINGS

Figure 2:
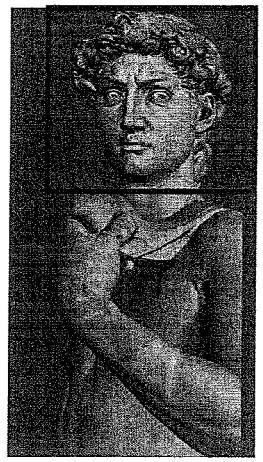
Figure 2:
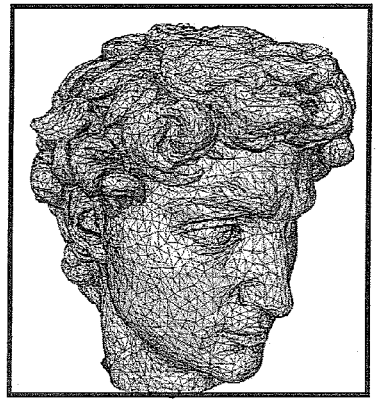
Figure 2:
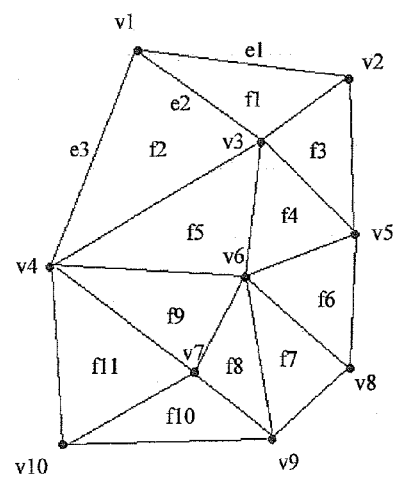
Figure 2:
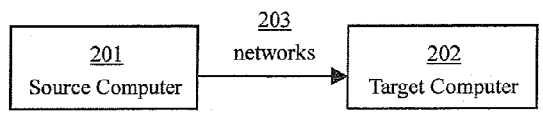
Figure 3:
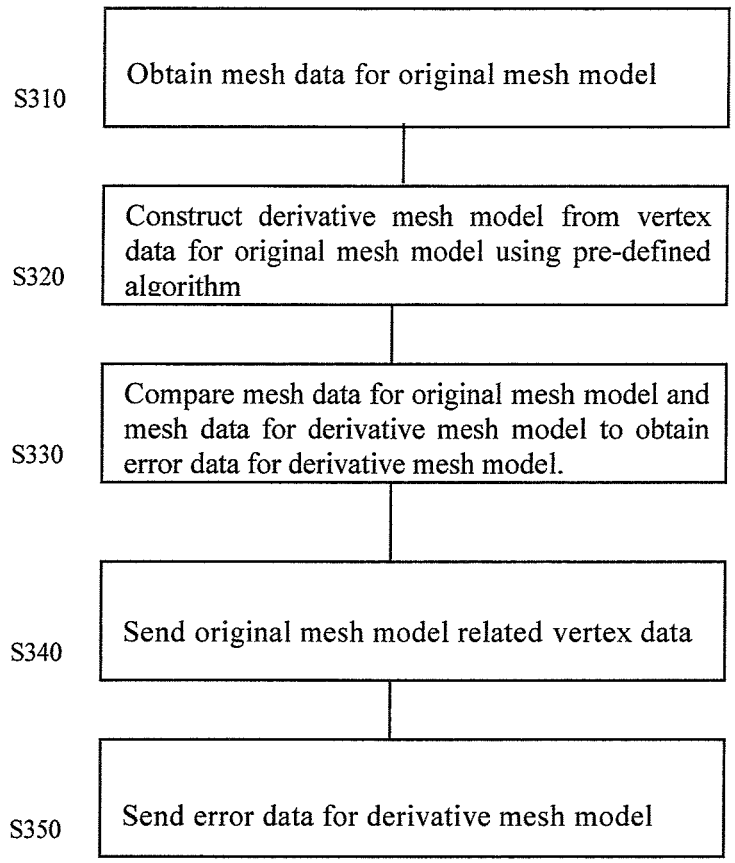
Figure 4A:
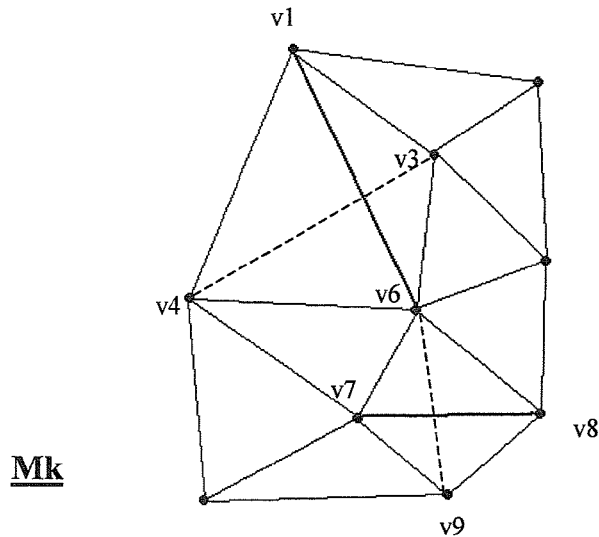
Figures 4B, 4C, 4D:
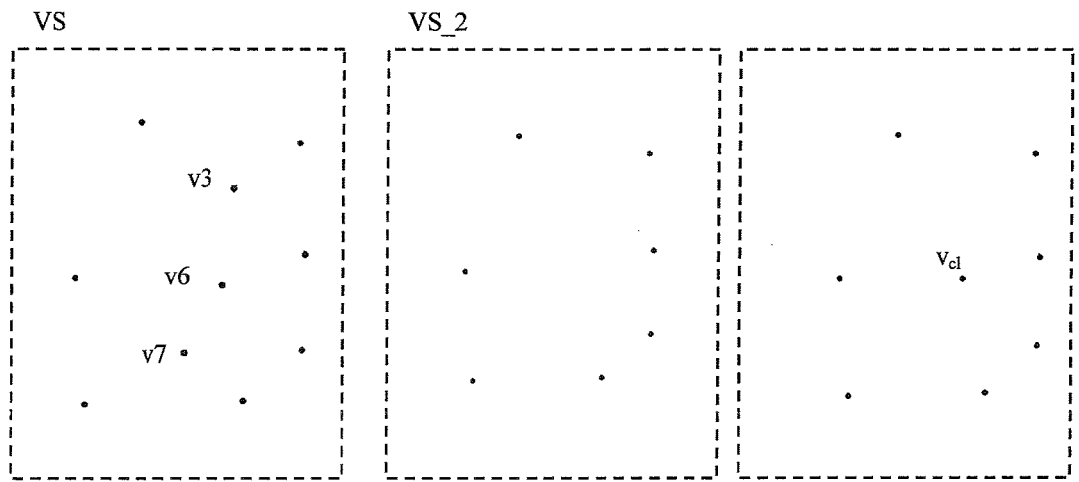
Figure 7:
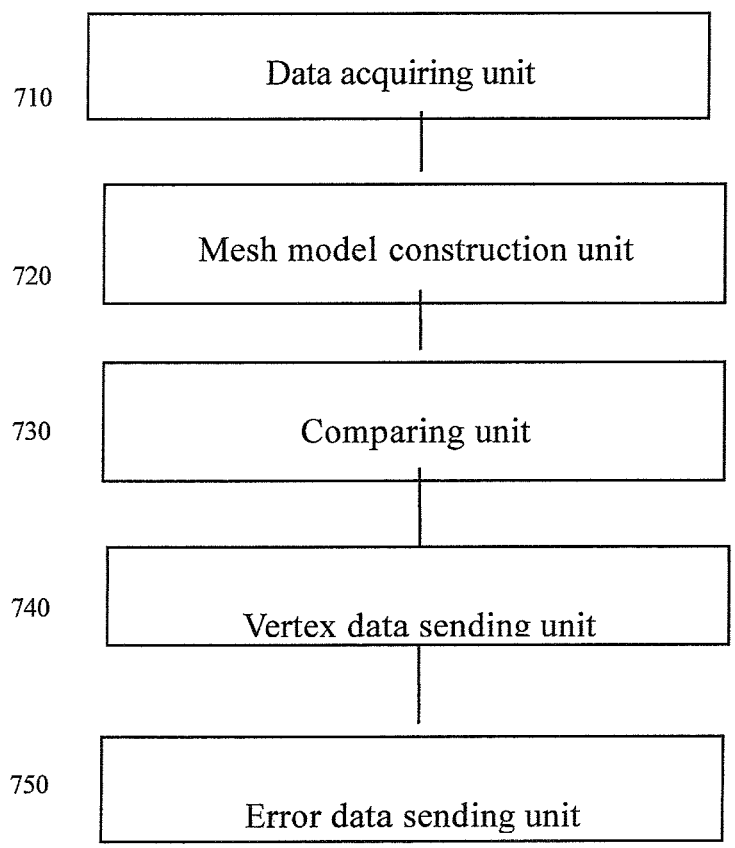
Figure 8:
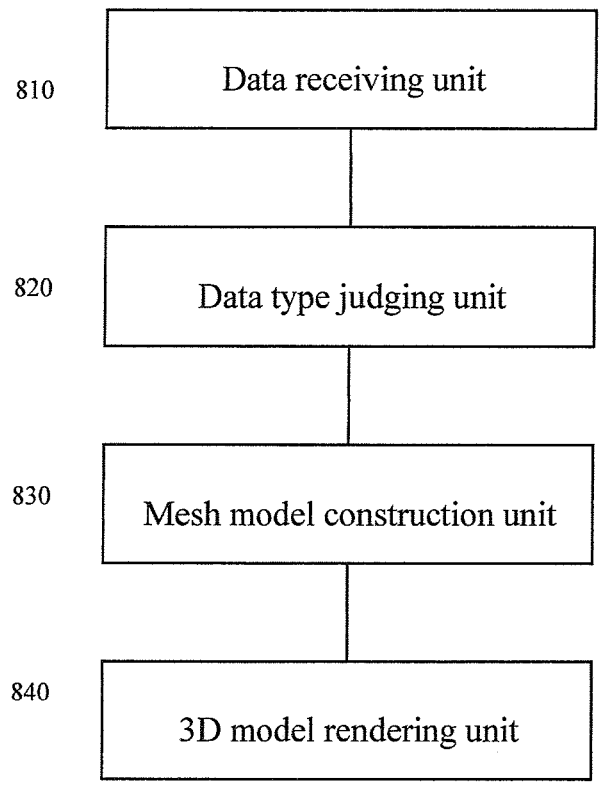

In conjunction with the drawings and with reference to the following detailed description, features, advantages, and other aspects of embodiments of the present invention will become more apparent from the several embodiments of the present invention shown in exemplary rather than limiting manner. In the drawings:

FIG. 1 shows a diagram of an exemplary computing system 100 adapted to be used for implementing various embodiments of the invention;

FIG. 2 illustratively shows a mesh model of a three-dimensional graphics and the data representation of the mesh model;

FIG. 3 illustratively shows a flowchart of the method for processing three-dimensional model data according an embodiment of the invention;

FIG. 4A schematically shows a derivative mesh model;

FIGS. 4B-4D schematically show the vertex data related to an original mesh model;

FIG. 5 illustratively shows a flowchart of the method for processing three-dimensional model data according an embodiment of the invention;

FIGS. 6A-6C schematically show a process of rendering a three-dimensional mesh model at the target computer 202;

FIG. 7 illustratively shows a diagram of the apparatus for processing three-dimensional model data according an embodiment of the invention; and FIG. 8 illustratively shows a diagram of the apparatus for processing three-dimensional model data according another embodiment of the invention;

DETAILED DESCRIPTION

The flowcharts and blocks in the figures illustrate the system, methods, as well as architecture, functions and operations executable by a computer program product according to embodiments of the present invention. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

FIG. 1 shows a block diagram of an illustrative computing system 100 that is adapted to implement embodiments of the present invention. The computing system 100 shown in FIG. 1 comprises a CPU (central processing unit) 101, a RAM (random access memory) 102, a ROM (read-only memory) 103, a system bus 104, an hard disk controller 105, a keyboard controller 106, a serial interface controller 107, a parallel interface controller 108, a display controller 109, a hard disk 110, a keyboard 111, a serial peripheral 112, a parallel peripheral 113 and a display 114. Among these components, connected to the system bus 104 are the CPU 101, the RAM 102, the ROM 103, the hard disk controller 105, the keyboard controller 106, the serial interface controller 107, the parallel controller 108 and the display controller 109. The hard disk 110 is connected to the hard disk controller 105; the keyboard 111 is connected to the keyboard controller 106; the serial peripheral 812 is connected to the serial interface controller 107; the parallel peripheral 113 is connected to the parallel interface controller 108; and the display 114 is connected to the display controller 109. It should be understood that the structural block diagram in FIG. 1 is shown only for illustration purpose, and is not intended to limit the scope of the present invention. In some cases, some devices may be added or reduced as required. For example, a network adapter may be configured for the computing system 100 so as to have the capacity of accessing computer networks.

The computing system 100 shown in FIG. 1 may be used for the implementation of the source computer and the destination computer applicable to various embodiments of the present invention.

Before various embodiments of the present invention are described, the mesh model of the three-dimensional graphics and the data representation of the mesh model are described are describe first. FIG. 2 schematically shows the mesh model of the three-dimensional graphics and the data representation of the mesh model.

In FIG. 2 it is shown an example of a three-dimensional graphics 210. The head in the graphics may be represented by a 3D mesh model (also referred to as "mesh model") indicated by the reference mark 220. The details of the mesh model are constituted by a large number of triangular faces.

The reference mark 230 indicates a simplified mesh model. The mesh model 230 is a closed structure constituted by ten vertices v1 to v10 and eleven triangular faces f1 to f11.

The reference mark 240 indicates a vertex list of the mesh model 230, which provides geometric information of the vertices of the mesh model 230. Specifically, in the vertex list 240 it is listed all of the vertices {v1, v2, v3 ... } of the mesh model 230 and the three-dimensional coordinates of each of the vertices, for example, a vertex v1 and its coordinates (x1, y1, z1).

The reference mark 250 indicates a face list of the mesh model 230. In the face list 250 it is listed all of the faces (f1, f2, ... ) of the mesh model 230 and the vertices constituting each of the faces, for example, a face f1 and its constituent vertices (v1, v2, v3).

An equivalent form of the face list 250 is an edge list 260. The edge list 260 lists all of the edges in the mesh model 230, e.g., an edge e1 connecting two vertices v1 and v2. The edge list 260 provides information of connections among the vertices of the mesh model 230.

The vertex list 240 and the face list 250 constitute a data set of the mesh model 230, referred to as "mesh data". Apparently, the data set or mesh data for the mesh model 230 may also be composed of the data represented by the vertex list 240 and the edge list 260, i.e., composed of the vertex set and edge set of the mesh model.

It can be said that the mesh model (hereinafter, also simply referred to as "mesh") is a closed structure constituted by vertices and edges connecting vertices.

For convenience of description, in the following description, an edge where a vertex is located is referred to as "adjacent edge" of the vertex, for example, both the edges e1 and e3 are adjacent edges of the vertex v1. Apparently, a vertex may have more than one adjacent edge. And a face where a vertex is located is referred to as "adjacent face" of the vertex, for example, both the faces f1 and f2 are adjacent faces of the vertex v1. Apparently, a vertex may have more than one adjacent face.

It is shown at the bottom of FIG. 2 a scenario of the application of the invention. As shown, in the Internet-based three-dimensional applications, it is needed to send mesh data for three-dimensional graphics via a network 203 from a source machine acting as the transmitting side (e.g., server) 201 to a target computer acting as the receiving side (e.g., client) 202. The data amount of the mesh models of the three-dimensional graphics is usually very large (on the order of up to 10 megabytes), and the higher the requirement for the accuracy of graphics, the greater the data amount. This renders high requirement for the bandwidth of the network 203. In case of insufficient bandwidth, the mesh model data might be unable to be timely transmitted from the source computer 201 to the target computer 202. As a result, the 3D graphics is unable to be rendered at the target computer in a timely manner, affecting the user's experience of at the receiving side.

The inventors noted that the number of edges of the mesh model is increased with the increase of the number of vertices. According to the Euler's Formula, for more complicated mesh models in practical applications, the number of edges may be approximately three times the number of vertices. The inventors have found that, when transmitting the mesh model via computer networks, the source computer 201 does not need to transmit information on the vertex data and information on the face/edge data simultaneously and the target computer 202 may also progressively display the 3D mesh model.

The basic idea of the present invention is to let the source computer 201 separately transmit the information on the vertex data in the mesh data to the target computer 202 first, and then send the information on the edge/face data in the mesh data to the target computer 202.

Accordingly, the target computer 202, upon receiving the information on the vertex data in the mesh data, will speculatively construct a derivative mesh model using a pre-defined algorithm existed in the prior art, and display the constructed derivative mesh model, and modify the derivative mesh model after receiving the information on the edge/face data in the mesh data. Since it is not necessary to send the information on the vertex data at the same time of sending the information on the edge/face data, a large amount of transmission bandwidth is saved, and the information on the vertex data and the information on the edges data or the face data can be smoothly and timely transmitted to target computer 202. After the information on the vertex data arrives at the target computer, the target computer is able to speculatively construct the mesh model according to the information on the vertex data and display a 3D graphics that is approximate to the original 3D graphics. Then, after the information on the edges data or the face data arrive at the target computer, the target computer may modify the 3D graphic displayed, until the 3D graphic displayed is the same as the 3D graphics.

Now referring to FIG. 3 and taking the mesh model 230 shown in FIG. 2 for example, a method for processing mesh data for a three-dimensional model is described. FIG. 3 schematically shows a flowchart of a method for processing mesh data for a three-dimensional model in accordance with an embodiment of the invention.

The method shown in FIG. 3 can be implemented on the source computer 201. The process is as the following.

First, in Step S310, the mesh data for an original mesh model is obtained.

The original mesh model is the mesh model to be displayed on the target computer 202. The mesh data for the original mesh model data comprise vertex data as well as edge data or face data.

The mesh model may be, for example, the mesh model 230 in FIG. 2 and its mesh data is either represented by the vertex list 240 and the edge list 260 or, equivalently, the vertex list 240 and the face list 250. The data of these lists may be stored in a database (not shown) in advance. Accordingly, in Step S310, the mesh data for the mesh model can be acquired from the database.

In Step S320, a derivative mesh model is constructed from the vertex data for the original mesh model by using a pre-defined mesh model construction algorithm.

There are a variety of mesh model construction algorithms in the prior art. These algorithms are designed to be able to speculatively calculate a derivative mesh model with a set of vertices as input. The Delaunay Triangulation Algorithm is such an algorithm. Other similar algorithms may be found in, for example, "A New Voronoi-Based Surface Reconstruction Algorithm" (Amenta et al., SIGGRAPH 1998) and "Poisson Surface Reconstruction" (Kazhdan et al, Symposium on Geometry Processing 2006). From these algorithms, an algorithm may be determined to be the pre-defined mesh model construction algorithm.

According to an embodiment of the invention, In Step S320, the Delaunay Triangulation Algorithm may be selected.

The Delaunay Triangulation Algorithm is able to generate edges between vertices based on spatial geometric relationship among vertices from a set of vertices, thereby constructing a set of triangular faces and thus constructing a target mesh model. Specifically, the Delaunay Triangulation Algorithm speculatively may calculate out the vertices between which there should be a connecting line by attempting to maximize the value of the least of the three interior angles of each triangular face. In most cases, the Delaunay Triangulation Algorithm would avoid generating a triangle that is too narrow and long in shape (e.g., a triangle of which at least one of the interior angles is less than 10 degrees). From experimental results disclosed in a number of literatures it may be known that, in the case of a large number of vertices, the Delaunay Triangulation Algorithm can make a relatively accurate guess on the edges among vertices.

Take the mesh model 230 shown in FIG. 2 for example. A mesh model, namely a derivative mesh model, may be constructed using the Delaunay Triangulation Algorithm with the vertex set VS={v1, v2, v3, v4, v5, v6, v7, v8, v9, v10} of the mesh model 230 as input. The derivative mesh model is indicated by a reference mark Mk in FIG. 4A.

As shown in FIG. 4A, the derivative mesh model Mk is not exactly same as the mesh model 230, but has a certain similarity with the mesh model 230. For example, for the derivative mesh model Mk, there is an edge between vertices v1 and v6 and an edge between vertices v7 and v8, whereas for the mesh model 230, there is no edge between vertices v1 and v6 and no edge between vertices v7 and v8. Also, for the mesh model 230, there is an edge between vertices v3 and v4 and an edge between vertices v6 and v9, whereas for the derivative mesh model Mk, there is no edge between vertices v3 and v4 (as indicated by a dashed line) and no edge between vertices v6 and v9 (as indicated by a dashed line).

In Step S330, the mesh data for the original mesh model and the mesh data for the derivative mesh model are compared to obtain the error data for the derivative mesh model.

The mesh data for an original mesh model are data for defining the original mesh model, for example, vertex data and edge data/face data. The mesh data for a derivative mesh model are data for defining the derivative mesh model data, for example vertex data and edge data/face data. As described above, the Delaunay Triangulation Algorithm is a speculative algorithm. The derivative mesh model constructed from the vertex data for the mesh model 230 according to the algorithm might not be exactly same as the mesh model 230, i.e., there is some difference or error between it and the original mesh model 230.

Such error may be ascertained by comparing the mesh data for the original mesh model with the mesh data for the derivative mesh model Mk.

According to an embodiment of the invention, said comparing the mesh data for the original mesh model with the mesh data for the derivative mesh model comprises comparing the edge data for the original mesh model with the edge data for the derivative mesh model and the error data comprises extra edge data and missing edge data, wherein the extra edge data include any edge that exists in the derivative mesh model but does not exist in the original mesh model, and the missing edge data include any edge that exists in the original mesh model but does not exist in the derivative mesh model.

For example, by comparing the edge data for the original mesh model 230 with the edge data for the derivative mesh model Mk, the error data for the derivative mesh model of Mk may be obtained as follows:

Extra edge data: an edge between vertices v1 and v6, and an edge between vertices v7 and v8;

Missing edge data: an edge between vertices v3 and v4, and an edge between vertices v6 and v9.

Generally, the extra edge data V (i,+e) of a derivative mesh model may be represented based on the vertices in the derivative mesh model according to the following expression (1):

$$V(i,+e)=\{e(i,1,+),e(i,2,+),\ldots e(i,p,+)\} \quad (1)$$

wherein the plus sign "+" denotes "extra", the expression "e (i, 1, +)" denotes an extra edge between vertex i and vertex 1, . . . and "e (i, p, +)" denotes an extra edge between vertex i and vertex p. In other words, by the expression (1), all extra edges may be shown from the adjacent edges of a vertex i of a derivative mesh mode.

For example, in the original mesh model 230, adjacent edges of the vertex v1 include edges e1, e2, e3 respectively between the vertex v1 and the vertex v2, v3 and v4. For the vertex v1 in the derivative mesh model Mk, there is an additional adjacent edge, i.e., the edge between the vertex v1 and v6. So, the edge between the vertex v1 and v6 is an extra edge. The extra edge may be denoted as "{e(1,6, +)}" in the extra edge data V (1, +e).

Similarly, the edge between the vertex v7 and v8 is also an extra edge, which is denoted as "{e(7,8,+)}" in the extra edge data V (7, +e).

In general, the set of extra edges for a derivative mesh model with n vertices (1 . . . n) is denoted by VS1, where $$VS1=\{V(1,+e),V(2,+e)\ldots V(n,+e)\} \quad (2)$$

Then, the set of extra edges for the derivative mesh model Mk is:

$$VS1=\{\{e(1,6,+)\},\{e(7,8,+)\}\}$$

In general, the missing edge data V (i, −e) of a derivative mesh model may be represented based on the vertices in the derivative mesh model according to the following expression (3):

$$V(i,-e)=\{e(i,1,-),e(i,2,-),\ldots e(i,p,-)\} \quad (3)$$

wherein the minus sign "−" denotes "missing", the expression "e(i,1,−)" denotes an missing edge between vertex i and vertex 1, . . . and "e (i,p,−)" denotes an missing edge between vertex i and vertex p. In other words, by the expression (3), all missing edges may be shown from the adjacent edges of a vertex i of a derivative mesh model.

For example, in the derivative mesh model Mk, there is no edge between the vertex v3 and v4, whereas in the original mesh model 230, there is an edge between v3 and v4. So, the edge between the vertex v3 and v4 in the derivative mesh model is a missing edge, which may be denoted as "{e(3,4, −)}" in the missing edge data V(3,−e).

Similarly, the missing edges for the derivative mesh model Mk also include the edge between the vertex v6 and v9, which may be denoted as "{e(6,9, −)}" in the missing edge data V (6,−e).

In general, the set of missing edges for a derivative mesh model with n vertices (1 . . . n) is denoted by VS2, where $$VS2=\{V(1,-e),V(2,-e)\ldots V(n,-e)\} \quad (4)$$

For example, for the derivative mesh model Mk, VS2={{e(3,4, −)}, {e(6,9, −)}}.

$$VS_{ERROR}=\{V(1,+e),V(2,+e)\ldots V(n,+e),\\V(1,-e),V(2,-e)\ldots V(n,-e)\}$$

Therefore, the set of error data of a derivative mesh model $VS_{ERROR}=VS1+VS2$, i.e., $$VS_{ERROR}=\{V(1,+e),V(2,+e)\ldots V(n,+e),\\V(1,-e),V(2,-e)\ldots V(n,-e)\}$$

For example, the error data set of the derivative mesh model Mk $VS_{ERROR}=\{\{e(1,6,+)\},\{e(7,8,+)\}, \{e(3,4,-)\},\{e(6,9,-)\}\}$.

According to another embodiment of the invention, said comparing the mesh data for the original mesh model with the mesh data for the derivative mesh model comprises comparing the face data for the original mesh model with the face data for the derivative mesh model and the error data comprises extra face data and missing face data, wherein the extra face data include any face that exists in the derivative mesh model but does not exist in the original mesh model, and the missing face data include any face that exists in the original mesh model but does not exist in the derivative mesh model.

As described above in conjunction with FIG. 2, there is a kind of equivalence between the edge data and the face data. According to the comparison of the edge data for the original mesh model with the edge data for the derivative mesh model as described in the previous one embodiment, it would not be hard to know how to compare the face data for the original mesh model with the face data for the derivative mesh model and obtain the error data, i.e., the extra face data and the missing face data.

The above steps S310-S330 are the preprocessing conducted for the data to be transmitted via the network 203 to the target computer 202 and used for rendering the mesh model. Apparently, the preprocessing may be conducted at any time and processing. The result of the preprocessing may be stored.

After the above preprocessing is executed and the result of the preprocessing is stored, the data may be transmitted to the receiving side 202 via the network 203.

When the transmitting the data to the receiving side 202 via the network, Step S340 is executed first.

In Step 340, the vertex data related to the original mesh model is sent.

Accordance to an embodiment of the invention, the vertex data related to the original mesh model is the vertex data for the original mesh model, such as a set of vertices VS={v1, v2, v3, v4, v5, v6, v7, v8, v9, v10}.

Alternatively, the vertex data related to the original mesh model may also be vertex data derived from the vertex data for the original mesh model.

According to an embodiment of the invention, derived vertex data may be generated based on the vertex data for the original mesh model prior to Step 340.

Accordingly, in Step 340, the vertex data related to the original mesh model may be the derived vertex data.

Referring now to FIGS. 4B-4D, description is provided on how to generate the derived vertex data. FIGS. 4B-4D schematically show the vertex data related to an original mesh model. FIG. 4B shows the vertex set VS of the original mesh model. As shown in the figure, vertices shown in the dashed block of FIG. 4B are the same as in the mesh model 230 of FIG. 2 in terms of amount and geometric position.

According to one embodiment of the present invention, the vertex set may be divided into a number of subsets, namely, VS_1, VS_2 . . . VS_x (x>1). Vertex data included in each of the subsets are derived vertex data and reduced vertex data as well. For example, the vertex set VS is divided into two subsets: VS_1={v3, v6, v7} and VS_2=VS−VS_1. The vertices in the dashed block of FIG. 4C represent the vertices included in the vertex subset VS_2. Compared with FIG. 4B, it is in lack of vertices v3, v6 and v7 in the dashed block of FIG. 4C, i.e., the vertex subset VS_2 does not include the vertices v3, v6 and v7.

Under circumstances where the vertex set of the original mesh model is very large and bandwidth is insufficient, vertex data of one vertex subset, e.g., vertex data of the subset VS_2, may be transmitted first. Then, vertex data of other vertex subsets, e.g., vertex data of the subset VS_1, may be transmitted.

According to an embodiment of the present invention, where the vertex set VS of the original mesh model is very large, the vertices in the vertex set VS may be clustered and the data of a vertex set generated may be used as derivative vertex data. This derivative vertex data is reduced vertex data. For example, FIG. 4D shows the derived vertex data that are generated as a result of the clustering of vertices in the vertex set VS. Comparing FIG. 4D with FIG. 4B shows that, in FIG. 4B, vertices v3, v6 and v7 are reduced to a vertex Vcl in the dashed block of FIG. 4D, which means that the vertex Vcl is the vertex generated as a result of clustering the vertices v3, v6 and v7. The vertex Vcl generated through clustering and the vertices v3, v6 and v7 before clustering have a mapping relationship, namely, Vcl<−>{v3, v6, v7}. The mapping relationship is also a kind of derived vertex data, belonging to vertex data that are related to the original mesh model.

In the case of large vertex set of the original mesh model and insufficient bandwidth, the derived vertex data shown in FIG. 4D, i.e., {v1, v2, v4, v5, v8, v9, v10, Vcl}, may be transmitted first. The target computer may render the 3D graphics based on the derived vertex data shown in FIG. 4D. Then, the mapping relationship, i.e., Vcl<−>{v3, v6, v7}, is transmitted. The target computer may determine the vertex data to be VS according to the subsequently received mapping relationship VCL<−>{v3, V6, v7}, and display the 3D graphics according to VS. In this way, the three-dimensional graphics may be progressively displayed.

The original mesh model related vertex data, transmitted in Step S340, may be used by the target computer 202 to display the three-dimensional mesh model. That will be further illustrated below in descriptions in conjunction FIG. 5.

Then, in Step S350, the error data for the derivative mesh model are transmitted. For example, the error data set for the derivative mesh model Mk, i.e., $VS_{ERROR}=\{\{e(1,6,+)\},\{e(7,8,+)\}, \{e(3,4,-)\},\{e(6,9,-)\}\}$ may be transmitted.

According to an embodiment of the present invention, wherein transmitting the error data for the derivative mesh model comprises dividing the error data into a plurality of error data subsets, and transmitting one of the error data subsets each time until all of the error data subsets are transmitted.

For example, the error data set $VS_{ERROR}$ of a derivative mesh model may be divided into a number of error data subsets as follows:

{V(1, +e), V(2, +e), V(1, −e), V(2, −e)}

{V(3, +e), V(4, +e), V(3, −e), V(4, −e)}

...

{V(n−1, +e), V(n, +e), V(n−1, −e) ... V(n, −e)}

One of the error data subsets is sent each time, until all of the error data subsets have been sent.

For example, the error data set $VS_{ERROR}=\{\{e(1,6,+)\},\{e(7,8,+)\}, \{e(3,4,-)\},\{e(6,9,-)\}\}$ may be divided into two error data sub-sets: $\{\{e(1,6,+)\}, \{e(3,4,-)\}\}$ and $\{\{e(6,9,-)\},\{e(7,8,+)\}\}$. Then, the two error data subsets and respectively transmitted.

It should be noted that the above two error data subsets are merely examples. In practical applications, the data amount of each error data subset is far more than that of the examples. However, the data amount of individual error data subset is less than that of the error data set $VS_{ERROR}$. In the case of insufficient bandwidth of the network 203, if the source computer 201 sends the error data subset of less data amount according to the bandwidth conditions, the error data set may arrive the target computer 202 in a timely manner.

The error data transmitted in Step S350 may be used by the target computer 202 for rendering three-dimensional mesh model.

Below with reference to FIG. 5, it is described the processing to be performed by the target computer 202 respectively for the original mesh model related vertex data and the error data for the derivative mesh model sent from the source computer 201.

FIG. 5 shows a flowchart of a method for progressively displaying a three-dimensional mesh model in accordance with an embodiment of the invention. The method shown in FIG. 5 may be implemented at the target computer 202. The process follows.

In Step S510, data for a three-dimensional model is received from the source computer 201 via the network 203.

From the above description in conjunction with FIG. 3, it may be known that the data sent by the source computer 201 to the target computer 202 may be the vertex data related to an original mesh model (Step S340), and may also be the error data of a derived mesh model (Step S350).

In Step S520, the target computer 202 determines the type of the received data in order to make corresponding processing. There are a variety of ways of implementing the determination of the type of data. A simple way is, for example, is the setting of identifiers to denote data types so as to distinguish between types of data transmitted by the transmitting side.

Depending on different types of the received data, the target computer 202 will make different processing. As shown respectively by the prismatic block 521 and 522, according to an embodiment of the invention, the receiving side is only required to make processing for the vertex data and the error data.

In response to the received data being the vertex data related to an original mesh model, the following operations are performed in Step S530:

constructing a derivative mesh model from the vertex data for the original mesh model by using a pre-defined mesh model construction algorithm; and displaying a three-dimensional model based on the constructed derivative mesh model.

Accordance to an embodiment of the invention, the pre-defined mesh model construction algorithm may be the Delaunay Triangulation Algorithm.

The pre-defined model construction algorithm should be the same as the mesh model construction algorithm used by the source computer 202. In practice, the predefined mesh model construction algorithm may be a mesh model construction algorithm deployed on the target computer, which is specified in advance. If there are a variety of mesh model construction algorithms deployed on the target computer, one of the mesh model construction algorithms may be selected as well at any time based on the notice from the source computer.

In the description made above in conjunction with FIG. 3, it has explained how to generate the edge data or the face data with a predefined mesh model construction algorithm.

In the description on Step 340 made above in conjunction with FIG. 3, it is pointed out that the vertex data related to the original mesh model transmitted in Step S340 may be either the vertex data for the original mesh model or derived vertex data.

Accordance to an embodiment of the invention, the vertex data related to the original mesh model is the vertex data for the original mesh model 230, i.e., the set of vertices VS={v1, v2, v3, v4, v5, v6, v7, v8, v9, v10}. In this case, a derivative mesh model Mk as shown in FIG. 4A is constructed according to the vertex set VS. Then, the three-dimensional mesh model is displayed according to the data of the derivative mesh model Mk.

Accordance to an embodiment of the invention, the vertex data related to the original mesh model is derived vertex data, for example, the derived vertex data as shown in FIG. 4C or 4D described above. In this case, a derivative mesh model Mk may also be constructed according to the vertex set as shown in FIG. 4C or 4D. Then, the three-dimensional mesh model is displayed according to the data of the derivative mesh model Mk.

After Step S30, the process goes back to Step S510 to continue receiving data.

In response to the received data being the error data for the derivative mesh model, the three-dimensional mesh model that is currently being displayed is modified with the received error data in Step S540.

As mentioned in conjunction with FIG. 3 in the above, the error data for the derivative mesh model comprises at least one of the following: extra edge data; missing edge data; extra face data; and missing face data.

According to an embodiment of the invention, in response to the error data comprising the extra edge data, the edge in the extra edge data is removed from the three-dimensional mesh model currently displayed. In response to the error data comprising the missing edge data, the edge in the missing edge data is added into the three-dimensional mesh model currently displayed. In response to the error data comprising the extra face data, the face in the extra face data is removed from the three-dimensional mesh model currently displayed. And, in response to the error data comprising the missing face data, the face in the missing face data is added into the three-dimensional mesh model currently displayed.

The error data for the derivative mesh model may be the data representing the difference between the mesh data for the derivative mesh model and the mesh data for the original mesh model, or a subset of the data representing the difference between the mesh data for the derivative mesh model and the mesh data for the original mesh model, i.e., a error data subset.

Referring to FIGS. 6A-6C, which schematically show the process of rendering a three-dimensional mesh model at the target computer 202. Assume, a derivative mesh model Mk as shown in FIG. 4A, for example, is constructed based on the vertex set VS in Step S30. Then, the three-dimensional mesh model is displayed according to the data of the derivative mesh model Mk. FIG. 6A shows the three-dimensional mesh model which is currently being displayed.

As previously described with reference to FIG. 3, for example, the error data derived mesh model Mk $VS_{ERROR}$={{e(1,6,+)},{e(7,8,+)},  {e(3,4,−)},{e(6,9,−)}}. That is, for the currently displayed three-dimensional mesh, the edge between the vertex v1 and v6 and the edge between the vertex v7 and v8 are extra edges. The edge between the vertex v3 and v4 and the edge between the vertex v6 and v9 are missing edges.

Assume the error data $VS_{ERROR}$ is divided into two error data subsets, i.e., {{e(1,6,+)}, {e(3,4,−)}} and {{e(6,9,−)},{e(7,8,+)}}.

If the data received in Step S510 is the error data subset {{e(1,6,+)}, {e(3,4,−)}}, then in Step S540, the edge between the vertex v1 and v6 will be removed from the currently displayed three-dimensional mesh model as shown in FIG. 6A, and the edge between the vertex v3 and v4 will be added. The result is as shown in FIG. 6B.

After Step S40, the process goes back to Step S510.

Next, the data received in Step S510 is the error data subset {{e(6,9,−)},{e(7,8,+)}}. So, in Step S540, the edge between the vertex v7 and v8 will be removed from the currently displayed three-dimensional mesh model as shown in FIG. 6B, and the edge between the vertex v6 and v9 is added. The result is as shown in FIG. 6C.

In the above it is described the method for processing mesh data of the three-dimensional model and the method for progressively rendering the three-dimensional model in accordance with embodiments of the invention. According to the same inventive concept, the invention also provides an apparatus processing the mesh data of the three-dimensional model and an apparatus for progressively rendering the three-dimensional model.

Refer to FIG. 7, which figure schematically shows a block diagram of an apparatus for processing the mesh data of the three-dimensional model according to an embodiment of the invention.

In general, the apparatus shown in FIG. 7 comprises a data acquiring unit 710, a mesh model construction unit 720, a comparison unit 730, a vertex data transmission unit 740, and an error data transmission unit 750.

The data acquisition unit 710 is configured to obtain the mesh data for an original mesh model.

The mesh model construction unit 720 is configured to construct a derivative mesh model from the vertex data for the original mesh model by using a pre-defined mesh model construction algorithm.

The comparison unit 730 is configured to compare the mesh data for the original mesh model with the mesh data for the derivative mesh model to obtain the error data for the derivative mesh model.

The vertex data transmission unit 740 is configured to transmit the vertex data related to the original mesh model.

The error data transmission unit 750 is configured to the error data for the derivative mesh model.

According to an embodiment of the invention, the pre-defined mesh model construction algorithm comprises the Delaunay Triangulation Algorithm.

According to an embodiment of the invention, the comparison unit 730 is configured to compare the edge data for the original mesh model with the edge data for the derivative mesh model and the error data comprises extra edge data and missing edge data, wherein the extra edge data include any edge that exists in the derivative mesh model but does not exist in the original mesh model, and the missing edge data include any edge that exists in the original mesh model but does not exist in the derivative mesh model.

According to an embodiment of the invention, the comparison unit 730 is configured to compare the face data for the original mesh model with the face data for the derivative mesh model and the error data comprises extra face data and missing face data, wherein the extra face data include any face that exists in the derivative mesh model but does not exist in the original mesh model, and the missing face data include any face that exists in the original mesh model but does not exist in the derivative mesh model.

According to an embodiment of the invention, the error data transmission unit 750 is configured to divide the error data into a plurality of error data subsets, and transmit one of the error data subsets each time until all of the error data subsets are transmitted.

Now refer to FIG. 8, which schematically shows a block diagram of an apparatus for processing the mesh data of the three-dimensional model according to another embodiment of the invention.

In generally, the apparatus shown in FIG. 8 includes: a data receiving unit 810, a data type judging unit 820, a mesh model construction unit 830 and a 3D model rendering unit 840.

The data receiving unit 810 is configured to receive data for rendering a three-dimensional mesh model.

The data type judging unit 820 is configured to determine the type of the data received by the data receiving unit.

The mesh model construction unit 830 is configured to in response to the received data being the vertex data related to an original mesh model, construct a derivative mesh model from the vertex data for the original mesh model by using a pre-defined mesh model construction algorithm.

According to an embodiment of the invention, the vertex data related to the original mesh model comprises one of the follows: the vertex data for the original mesh model; vertex data derived from the vertex data for the original mesh model.

The 3D model rendering unit 840 is configured to display the constructed derivative mesh model, wherein the 3D model rendering unit is further configured to, in response to the received data being the error data for the derivative mesh model, modify the three-dimensional mesh model that is being displayed with the received error data.

According to an embodiment of the invention, the pre-defined mesh model construction algorithm comprises the Delaunay Triangulation Algorithm.

According to an embodiment of the invention, the error data comprises at least one of the following: extra edge data; missing edge data; extra face data; and missing face data. The 3D model rendering unit 840 is configured to remove the edge in the extra edge data from the three-dimensional mesh model currently displayed in response to the error data comprising the extra edge data; add the edge in the missing edge data into the three-dimensional mesh model currently displayed in response to the error data comprising the missing edge data; remove the face in the extra face data from the three-dimensional mesh model currently displayed in response to the error data comprising the extra face data; and add the face in the missing face data into the three-dimensional mesh model currently displayed in response to the error data comprising the missing face data.

The apparatus for processing three-dimensional model according to embodiments of the invention is described in the above. Since detailed description of embodiments of the method for configuring identity federation configuration of the invention is provided in previous paragraphs, the description of the apparatus in the above omits the content that repeats or may readily be derived from the description of the method.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction.

Therefore, in some embodiments, the above one or more optional steps may be omitted. Specific embodiment of each step may be different from the depiction. All these variations fall within the spirit and scope of the present invention.

The present invention may adopt a form of hardware embodiment, software embodiment or an embodiment comprising hardware components and software components. In a preferred embodiment, the present invention is implemented as software, including, without limitation to, firmware, resident software, micro-code, etc.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

The invention claimed is:

1. A method for processing three-dimensional model data, comprising:
   obtaining mesh data for an original mesh model;
   constructing a derivative mesh model from vertex data for the original mesh model by using a pre-defined mesh model construction algorithm;

comparing the mesh data for the original mesh model with the mesh data for the derivative mesh model to obtain an error data for the derivative mesh model;

transmitting the vertex data related to the original mesh model; and displaying a three-dimensional model based on the constructed derivative mesh model; and separately transmitting the error data for the derivative mesh model, and responsive to receiving the error data for the derivative mesh model, modifying the three-dimensional mesh model that is being displayed with the received error data.

2. The method of claim 1, wherein said comparing the mesh data for the original mesh model with the mesh data for the derivative mesh model comprises comparing the edge data for the original mesh model with the edge data for the derivative mesh model and the error data comprises extra edge data and missing edge data, and wherein the extra edge data include any edge that exists in the derivative mesh model but does not exist in the original mesh model, and the missing edge data include any edge that exists in the original mesh model but does not exist in the derivative mesh model.

3. The method of claim 2, wherein said transmitting the error data for the derivative mesh model comprises dividing the error data into a plurality of error data subsets, and transmitting one of the error data subsets each time until all of the error data subsets are transmitted.

4. The method of claim 1, wherein said comparing the mesh data for the original mesh model with the mesh data for the derivative mesh model comprises comparing the face data for the original mesh model with the face data for the derivative mesh model and the error data comprises extra face data and missing face data, and wherein the extra face data include any face that exists in the derivative mesh model but does not exist in the original mesh model, and the missing face data include any face that exists in the original mesh model but does not exist in the derivative mesh model.

5. The method of claim 1, wherein the vertex data related to the original mesh model is the vertex data for the original mesh model.

6. The method of claim 1, further comprising:
generating derived vertex data according to the vertex data for the original mesh model, wherein the vertex data related to the original mesh model comprises the derived vertex data.

7. A method for processing three-dimensional model data, comprising:
receiving data for rendering a three-dimensional mesh model, said received data including vertex data relating to an original mesh model;
in response to the received data being the vertex data related to the original mesh model, performing the following:
constructing a derivative mesh model from the vertex data related to the original mesh model by using a pre-defined mesh model construction algorithm and
receiving an error data for the derivative mesh model; and
displaying a three-dimensional model based on the constructed derivative mesh model; and
in response to the received data being the error data for the derivative mesh model, modifying the three-dimensional mesh model that is being displayed with the received error data.

8. The method of claim 7, wherein the vertex data related to the original mesh model comprises one of the follows:

the vertex data for the original mesh model; or
vertex data derived from the vertex data for the original mesh model.

9. The method of claim 7, wherein the error data comprises at least one of the following:
extra edge data;
missing edge data;
extra face data; and
missing face data,
and wherein said modifying the three-dimensional mesh model that is being displayed with the received error data comprises:
in response to the error data comprising the extra edge data, remove the edge in the extra edge data from the three-dimensional mesh model currently displayed;
in response to the error data comprising the missing edge data, add the edge in the missing edge data into the three-dimensional mesh model currently displayed;
in response to the error data comprising the extra face data, remove the face in the extra face data from the three-dimensional mesh model currently displayed; and
in response to the error data comprising the missing face data, add the face in the missing face data into the three-dimensional mesh model currently displayed.

10. The method of claim 9, wherein the error data for the derivative mesh model comprises one of the following:
the data representing difference between the mesh data for the derivative mesh model and the mesh data for the original mesh model; and
a subset of the data representing difference between the derivative mesh model and the original mesh model.

11. An apparatus for processing three-dimensional model data, comprising:
a memory storage device, and
a hardware processor device coupled to the memory storage device, said hardware processor configured to perform a method to:
obtain the mesh data for an original mesh model, said obtained mesh data comprising vertex data relating to the original mesh model;
construct a derivative mesh model from the vertex data relating to the original mesh model by using a pre-defined mesh model construction algorithm;
compare the mesh data for the original mesh model with a mesh data for the derivative mesh model to obtain an error data for the derivative mesh model;
transmit the vertex data related to the original mesh model;
displaying a three-dimensional model based on the constructed derivative mesh model; and
separately transmit the error data for the derivative mesh model, and
responsive to receiving the error data for the derivative mesh model, modifying the three-dimensional mesh model that is being displayed with the received error data.

12. The apparatus of claim 11, wherein to compare the mesh data for the original mesh model with the mesh data for the derivative mesh model, the hardware processor device is further configured to compare the edge data for the original mesh model with the edge data for the derivative mesh model and the error data comprises extra edge data and missing edge data, and wherein the extra edge data include any edge that exists in the derivative mesh model but does not exist in the original mesh model, and the missing edge data include any edge that exists in the original mesh model but does not exist in the derivative mesh model.

13. The apparatus of claim 12, wherein to transmit the error data, the hardware processor device is configured to divide the error data into a plurality of error data subsets, and transmit one of the error data subsets each time until all of the error data subsets are transmitted.

14. The apparatus of claim 11, wherein to compare the mesh data for the original mesh model with the mesh data for the derivative mesh model, the hardware processor device is further configured to compare the face data for the original mesh model with the face data for the derivative mesh model and the error data comprises extra face data and missing face data, and wherein the extra face data include any face that exists in the derivative mesh model but does not exist in the original mesh model, and the missing face data include any face that exists in the original mesh model but does not exist in the derivative mesh model.

15. The apparatus of claim 11, wherein the vertex data related to the original mesh model is the vertex data for the original mesh model.

16. The apparatus of claim 11, wherein said hardware processor device is further configured to generate derived vertex data according to the vertex data for the original mesh model, wherein the vertex data related to the original mesh data comprises the derived vertex data.

17. An apparatus for processing three-dimensional model data, comprising:
a memory storage device, and
a hardware processor device coupled to the memory storage device, said hardware processor configured to perform a method to:
receive data for rendering a three-dimensional (3D) mesh model;
determine the type of the data received by the data receiving unit;
in response to the received data being the vertex data related to an original mesh model, construct a derivative mesh model from the vertex data for the original mesh model by using a pre-defined mesh model construction algorithm and
receive an error data for the derivative mesh model; and
display the constructed derivative mesh model, and in response to the received data being the error data for the derivative mesh model, modify the three-dimensional mesh model that is being displayed with the received error data.

18. The apparatus of claim 17, wherein the vertex data related to the original mesh model comprises one of the following:
the vertex data for the original mesh model; or
vertex data derived from the vertex data for the original mesh model.

19. The apparatus of claim 17, wherein the error data comprises at least one of the following:
extra edge data;
missing edge data;
extra face data; and
missing face data,
and the hardware processor device is further configured to:
remove the edge in the extra edge data from the three-dimensional mesh model currently displayed in response to the error data comprising the extra edge data;
add the edge in the missing edge data into the three-dimensional mesh model currently displayed in response to the error data comprising the missing edge data;
remove the face in the extra face data from the three-dimensional mesh model currently displayed in response to the error data comprising the extra face data; and
add the face in the missing face data into the three-dimensional mesh model currently displayed in response to the error data comprising the missing face data.

20. The apparatus of claim 19, wherein the error data for the derivative mesh model comprises one of the following:
the data representing difference between the mesh data for the derivative mesh model and the mesh data for the original mesh model; and
a subset of the data representing difference between the derivative mesh model and the original mesh model.

* * * * *